(12) United States Patent
Kitt

(10) Patent No.: US 10,023,078 B2
(45) Date of Patent: Jul. 17, 2018

(54) THREADER DEVICE FOR A CHILD SAFETY SEAT

(71) Applicant: Matthew A. Kitt, Salt Lake City, UT (US)

(72) Inventor: Matthew A. Kitt, Salt Lake City, UT (US)

( * ) Notice: Subject to any disclaimer, the term of this patent is extended or adjusted under 35 U.S.C. 154(b) by 0 days.

(21) Appl. No.: 15/004,259

(22) Filed: Jan. 22, 2016

(65) Prior Publication Data

US 2016/0214509 A1    Jul. 28, 2016

Related U.S. Application Data

(60) Provisional application No. 62/108,365, filed on Jan. 27, 2015.

(51) Int. Cl.
*B60N 2/20* (2006.01)
*B60N 2/28* (2006.01)
*B60R 22/10* (2006.01)
*B60R 22/00* (2006.01)

(52) U.S. Cl.
CPC .......... *B60N 2/2806* (2013.01); *B60R 22/105* (2013.01); *B60N 2/286* (2013.01); *B60N 2/2839* (2013.01); *B60R 2022/006* (2013.01)

(58) Field of Classification Search
CPC ..... B60N 2/2806; B60N 2/2839; B60N 2/286
USPC ............... 297/482, 250.1, 487, 488, 483; 280/801.1, 808
See application file for complete search history.

(56) References Cited

U.S. PATENT DOCUMENTS

| | | |
|---|---|---|
| 31,960 A | 4/1861 | De Forest |
| 215,612 A | 5/1879 | Howland |
| 322,284 A | 7/1885 | Havell |
| 478,827 A | 7/1892 | Stott |
| 481,338 A | 8/1892 | Weigand |
| 596,564 A | 1/1898 | Summers |
| 617,970 A | 1/1899 | Ruff |
| 619,229 A | 2/1899 | Roszell |
| 945,984 A | 1/1910 | Schomburg |
| 1,341,357 A | 5/1920 | Careaga |
| 1,639,226 A | 8/1927 | Haines |
| 1,974,052 A | 9/1934 | Lang |
| 2,120,030 A | 5/1938 | Little |
| 2,190,792 A | 2/1940 | Lippard |
| 2,422,269 A | 6/1947 | Thompson |
| 2,620,104 A | 12/1952 | Graham |
| 2,677,485 A | 5/1954 | Surbeck |
| 2,705,098 A | 3/1955 | Sipler, Jr. |
| 2,721,014 A | 10/1955 | Allen |
| 2,729,372 A | 1/1956 | Winter |
| 2,758,648 A | 8/1956 | Dodds |
| 3,229,484 A | 1/1966 | Standart |
| 3,473,710 A | 10/1969 | Lindquist |
| 3,525,460 A | 8/1970 | Hendy |
| 4,942,646 A | 7/1990 | Sebastian |
| 5,016,383 A | 5/1991 | Rizzetto |

(Continued)

*Primary Examiner* — Syed A Islam
(74) *Attorney, Agent, or Firm* — Geoffrey E. Dobbin; Dobbin IP Law P.C.

(57) ABSTRACT

The invention provides a seatbelt threader device with a sheath receiving at least one or both of the lap and shoulder straps of a seatbelt therein, and a male component of a seatbelt buckle at a distal end thereof, so that the male component can be inserted through the slot of the child safety seat.

10 Claims, 9 Drawing Sheets

(56) References Cited

U.S. PATENT DOCUMENTS

| | | | |
|---|---|---|---|
| 5,161,824 A * | 11/1992 | Li | B60R 22/14 |
| | | | 280/801.1 |
| 5,347,688 A | 9/1994 | Ross | |
| 5,815,843 A | 10/1998 | Brillhart, III et al. | |
| 5,881,738 A | 3/1999 | Villani | |
| 6,135,852 A * | 10/2000 | Young | A41F 15/02 |
| | | | 2/268 |
| 6,382,730 B1 * | 5/2002 | Closner | B60R 22/00 |
| | | | 297/482 |
| 6,520,389 B1 | 2/2003 | Bowman | |
| 7,526,842 B2 | 5/2009 | Wemmer | |
| 8,544,704 B2 | 10/2013 | Fitzpatrick et al. | |
| 2004/0251721 A1 * | 12/2004 | Yoshida | B60N 2/2851 |
| | | | 297/250.1 |
| 2005/0015943 A1 | 1/2005 | Wemmer | |
| 2005/0178807 A1 | 8/2005 | Fitzpatrick | |
| 2007/0178761 A1 | 8/2007 | Wemmer | |

\* cited by examiner

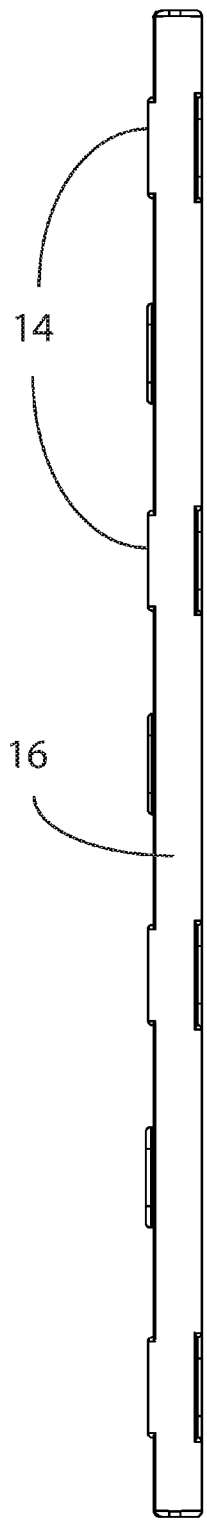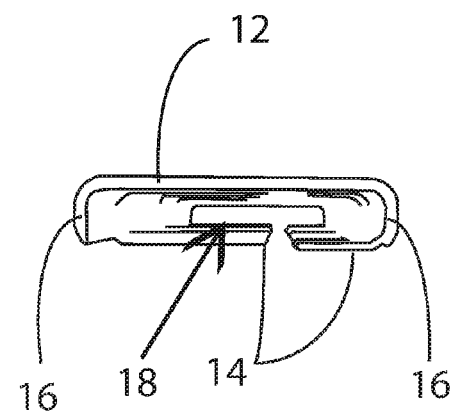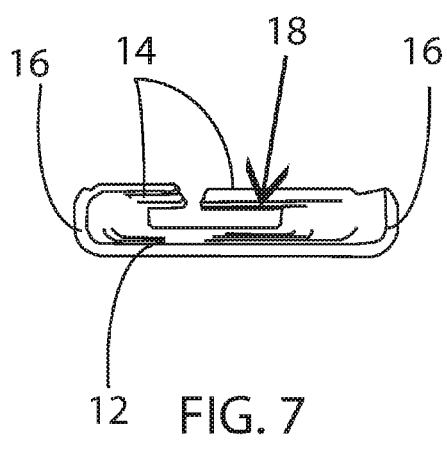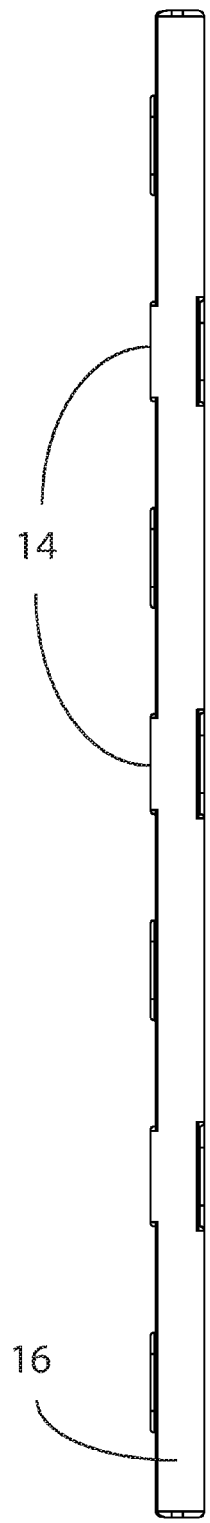

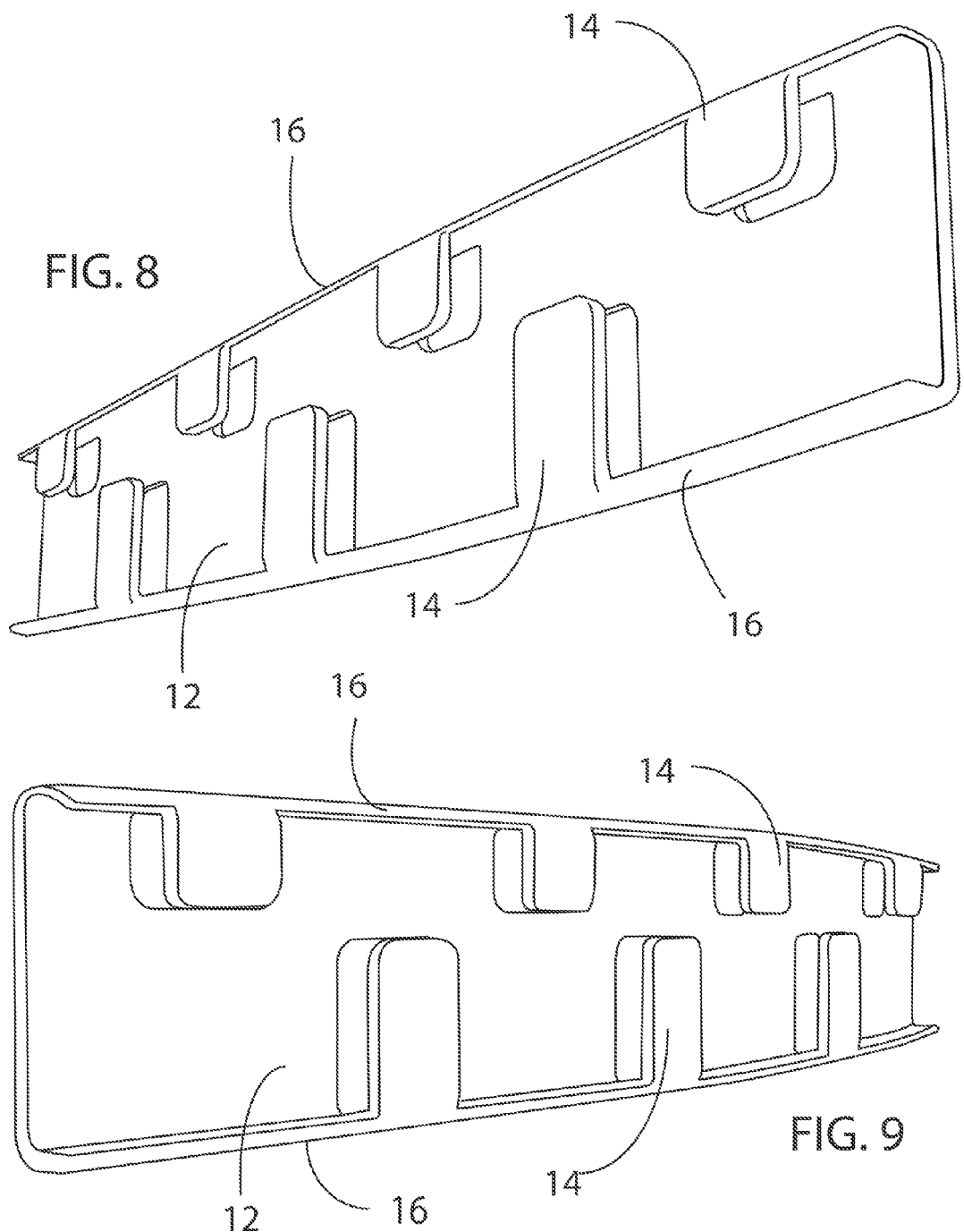

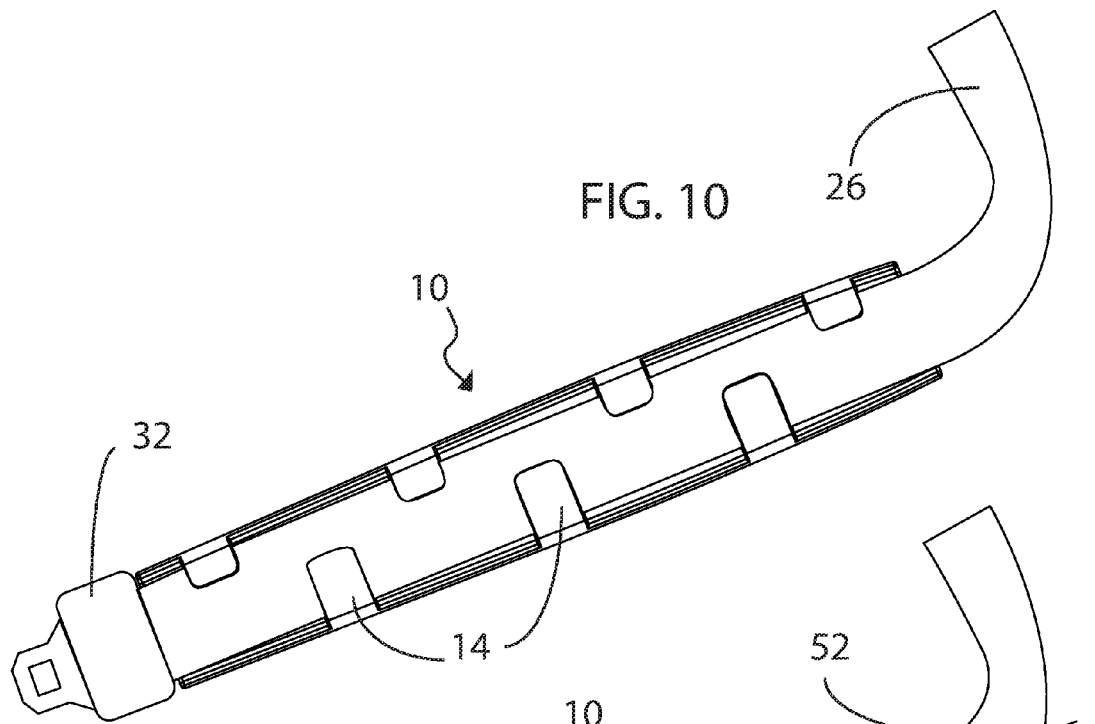
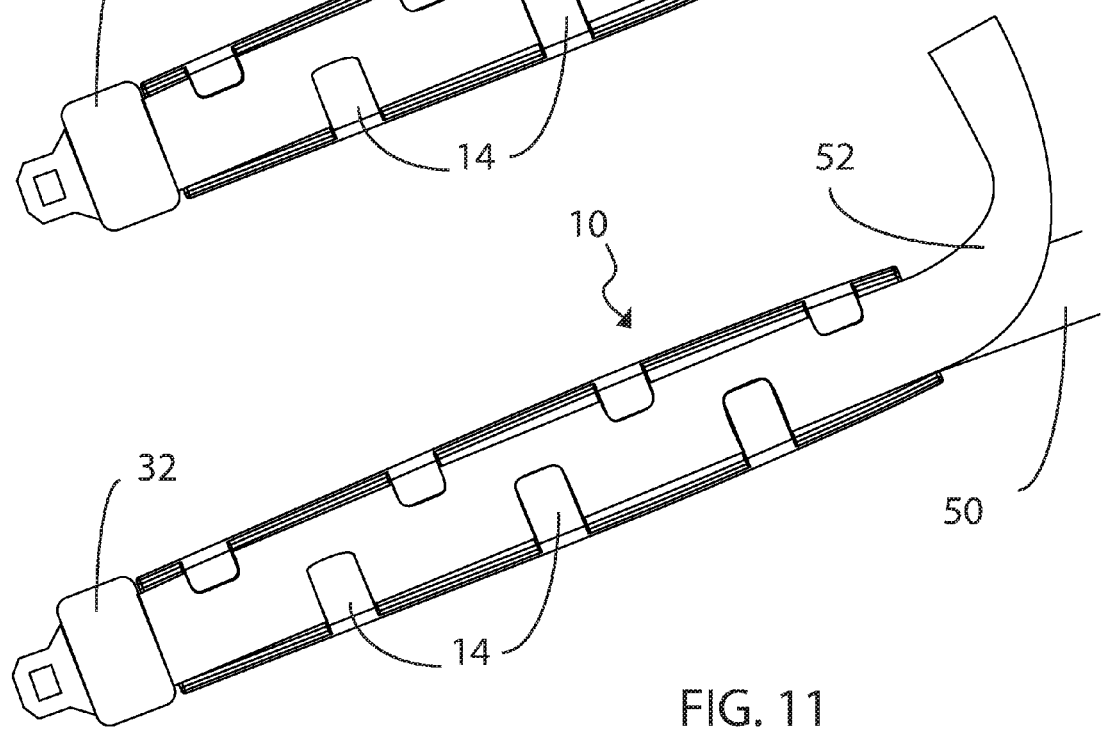

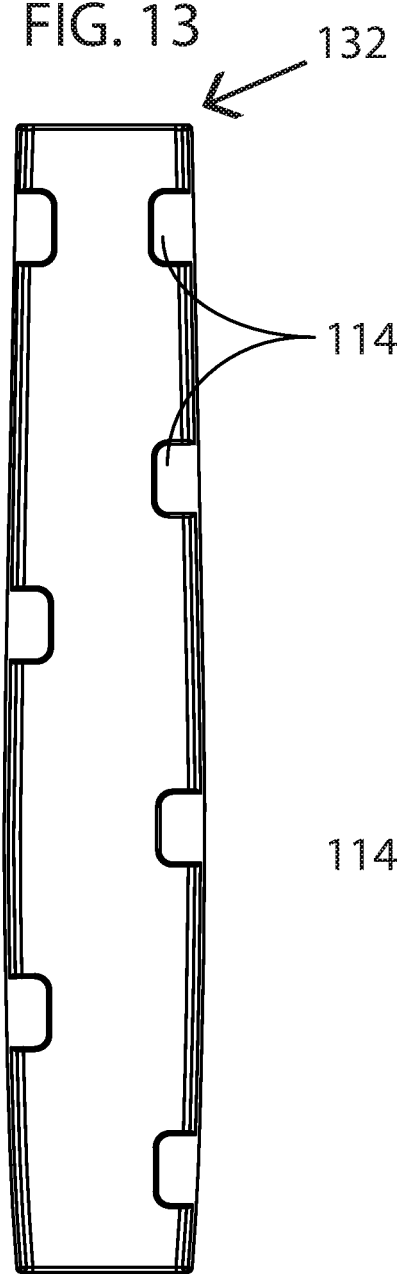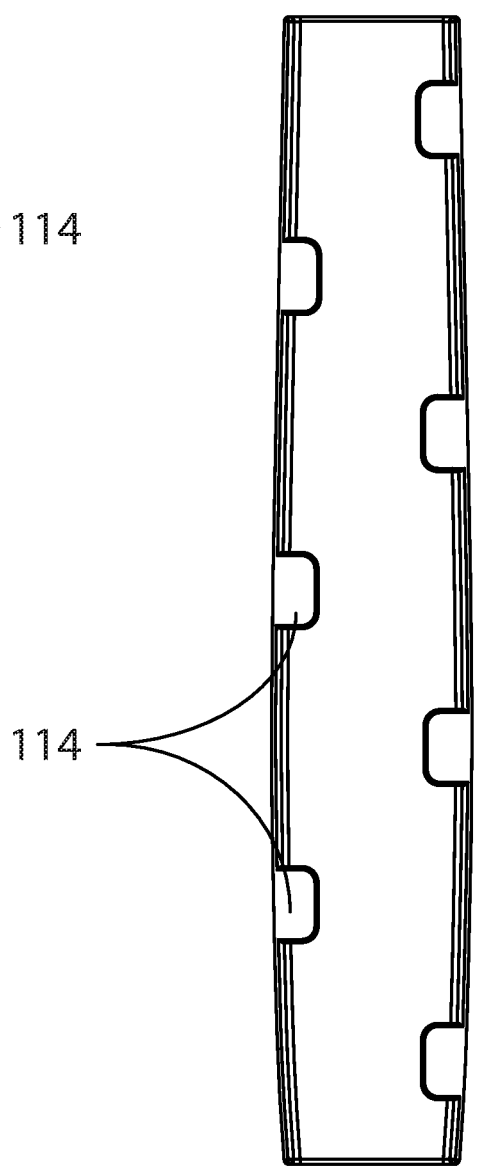

FIG. 15
FIG. 16
FIG. 17
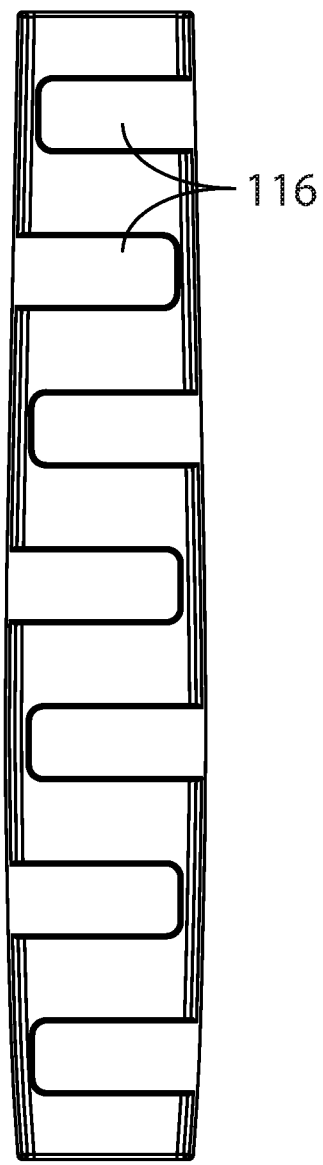
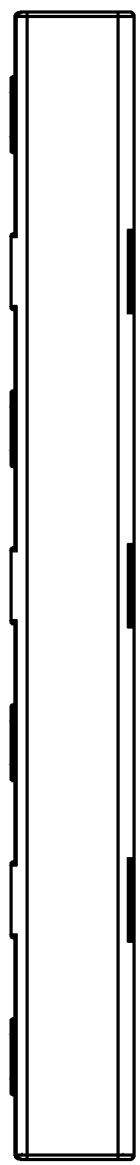

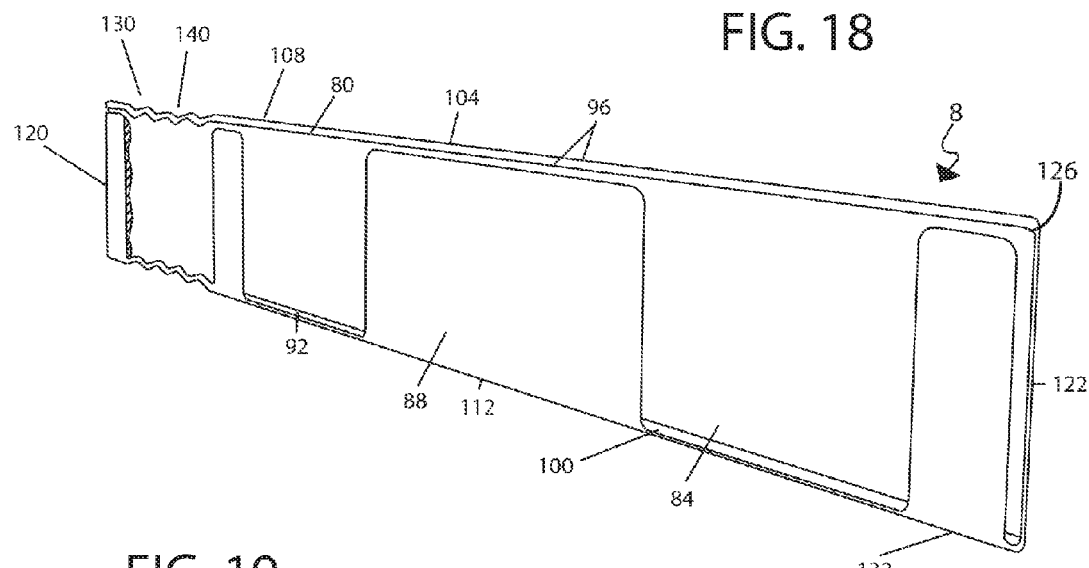
FIG. 18
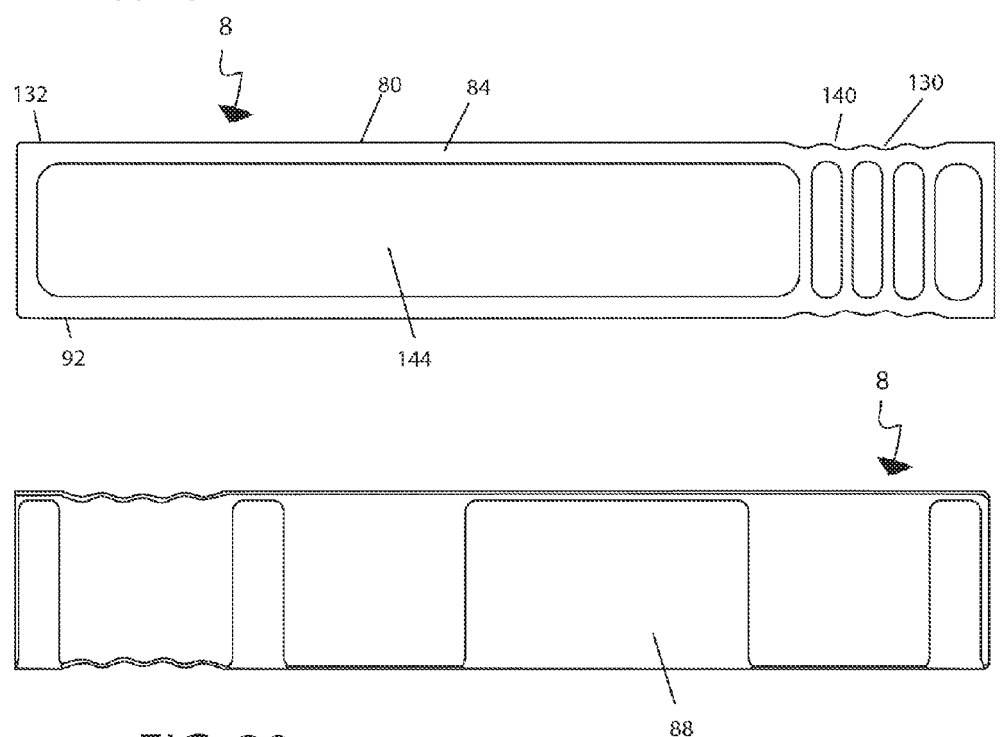
FIG. 19
FIG. 20

THREADER DEVICE FOR A CHILD SAFETY SEAT

CROSS-REFERENCES TO RELATED APPLICATIONS

This Application claims priority as a non-provisional perfection of prior filed application No. 62/108,365, filed Jan. 27, 2015 and incorporates the same by reference herein in its entirety.

FIELD OF THE INVENTION

The present invention relates generally to child safety seats for a vehicle. More particularly, the present invention relates to a seat belt attachment to facilitate buckling the child safety seat to the vehicle.

BACKGROUND OF THE INVENTION

Child safety seats are utilized in vehicles to provide safer seating and restraint for children. Such child safety seats are placed on existing vehicle seats, and retained with the vehicles existing seat belt restraining system. The existing seat belt restraint system can include an elongated strap with a lap strap or belt and a shoulder strap or belt, between which is a latch plate of a buckle that buckles to a coupler of the buckle on another side of the seat.

Such child safety seats are often provided with a rear slot, or series of slots, through which the seat belt is inserted. Such child safety seats can provide a smaller seating area, supplemental side restraints, and/or a five point safety harness.

One problem with child safety seats is that they are commonly installed incorrectly. Incorrectly installed child safety seats can thwart the safety features of the child safety seat. It is reported that 71% of child seats are installed improperly, and that 215 children died in accidents in 2013 where their child seat was installed improperly. One problem commonly faced by users of such child safety seats is the difficulty associated with installing the child safety seat. As described above, such child safety seats are often provided with a rear slot, or series of slots, through which the seat belt is inserted to secure the child safety seat to the vehicle seat. Inserting the seat belt through the slot(s) can be difficult and frustrating. Some solutions have been proposed. For example, see U.S. Pat. Nos. 7,093,905 and 7,210,743. Such devices can require complex connections to the seat belt. Another solution has been to provide a base to which the child safety seat is removably secured; but, the seat belt must still be inserted through the base.

SUMMARY OF THE INVENTION

It has been recognized that it would be advantageous to develop a device and method to facilitate the insertion of the seat belt through the slot(s) of a child safety seat. The invention provides a seatbelt threader device with a sheath receiving both the lap and shoulder straps of a seatbelt therein, the male component of a seatbelt buckle being proximate the sheath, so that the male component, and the associated seat belt, can be inserted through the slot of the child safety seat for easy access and insertion into the female component of the buckle.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is left elevation of the seatbelt threader device of FIG. 2.

FIG. 5 is right elevation of the seatbelt threader device of FIG. 2.

FIG. 6 is bottom plan view of the seatbelt threader device of FIG. 2.

FIG. 7 is top plan view of the seatbelt threader device of FIG. 2.

FIG. 8 is a perspective view of the seatbelt threader device of FIG. 2.

FIG. 9 is an alternate perspective view of the seatbelt threader device of FIG. 2.

FIG. 10 is a rear perspective view of the threader of FIG. 2 containing a lap-style seatbelt.

FIG. 11 is rear perspective view of the threader of FIG. 2 containing a shoulder and lap-style seatbelt.

FIG. 13 is a rear elevation of a threader according to an alternate embodiment of the invention.

FIG. 14 is a rear elevation of a threader according another alternate embodiment of the invention.

FIG. 15 is a rear elevation of a threader according another alternate embodiment of the invention.

FIG. 16 is a side elevation of a threader according another alternate embodiment of the invention.

FIG. 17 is a side elevation of a threader according another alternate embodiment of the invention.

FIG. 18 is a rear perspective view of a threader according to yet another embodiment of the invention.

FIG. 19 is a front elevation of the threader of FIG. 18.

FIG. 20 is a rear elevation of the threader of FIG. 18.

Reference will now be made to the exemplary embodiments illustrated, and specific language will be used herein to describe the same. It will nevertheless be understood that no limitation of the scope of the invention is thereby intended. It should be noted that the articles "a", "an", and "the", as used in this specification, include plural referents unless the content clearly dictates otherwise.

DETAILED DESCRIPTION OF EXAMPLE EMBODIMENTS

Definitions and Environment

The term "child safety seat" is used broadly herein to refer to a supplemental seat that is securable in a vehicle, often upon an existing vehicle seat. Such a child safety seat can provide its own safety harness or belt system. In addition, such a child safety seat can be referred to as a child seat, a booster, a booster seat, a car seat, etc. The term "child safety seat" also includes a base that removably receives the child safety seat.

The term "strap" as used in the context of a seatbelt shall be deemed to include any flaccid portion of a seatbelt, whether a shoulder belt, lap belt, section of a belt, or combination thereof.

Figure 1:
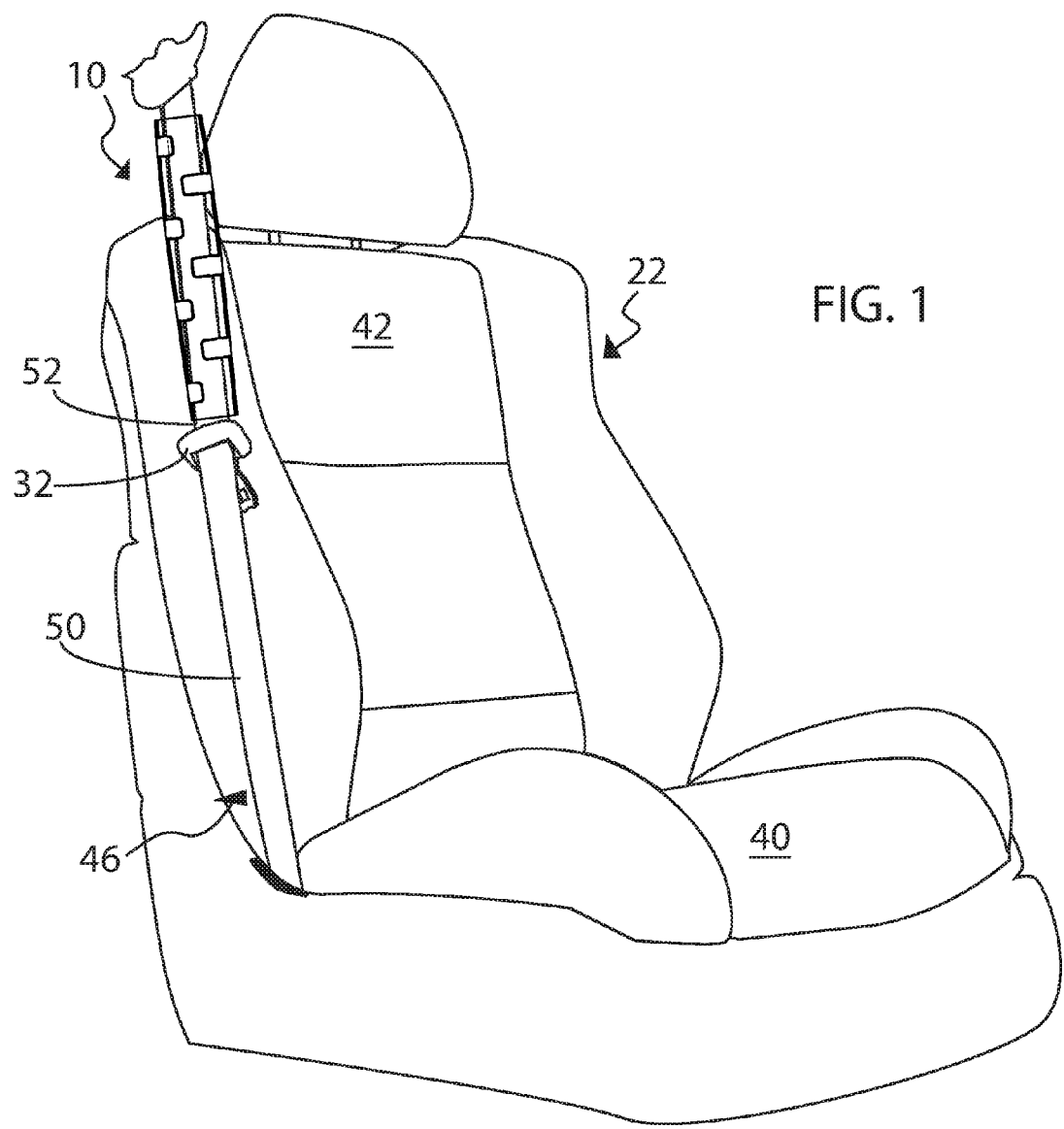
FIG. 1 is a perspective view of an automobile's seat, with one embodiment of the present invention installed upon a seatbelt.
Figure 2:
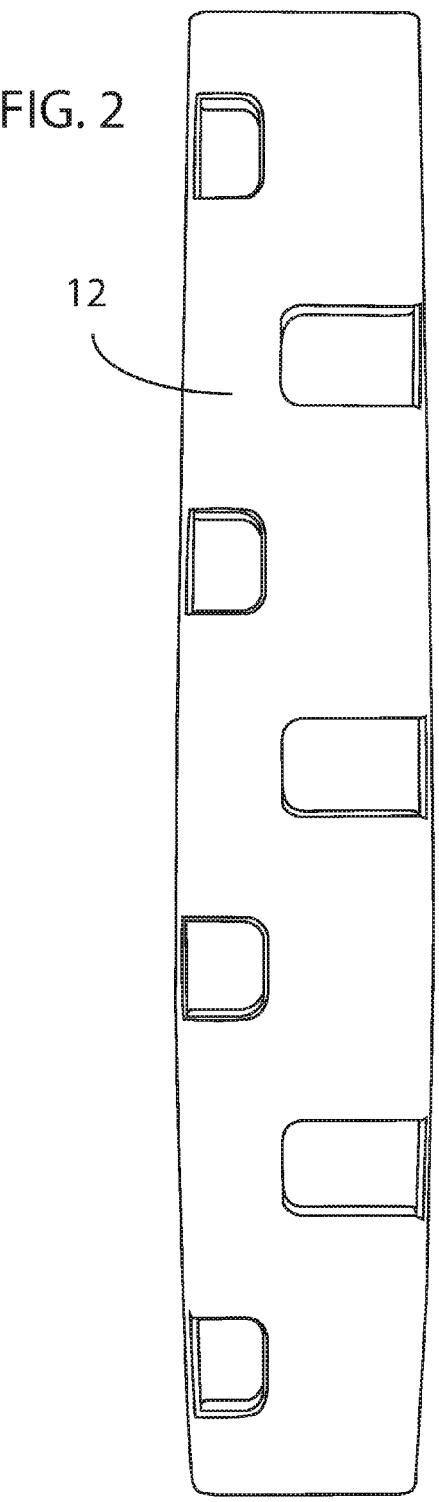
FIG. 2 is a rear elevation of a seatbelt threader device in accordance with an embodiment of the present invention.
Figure 3:
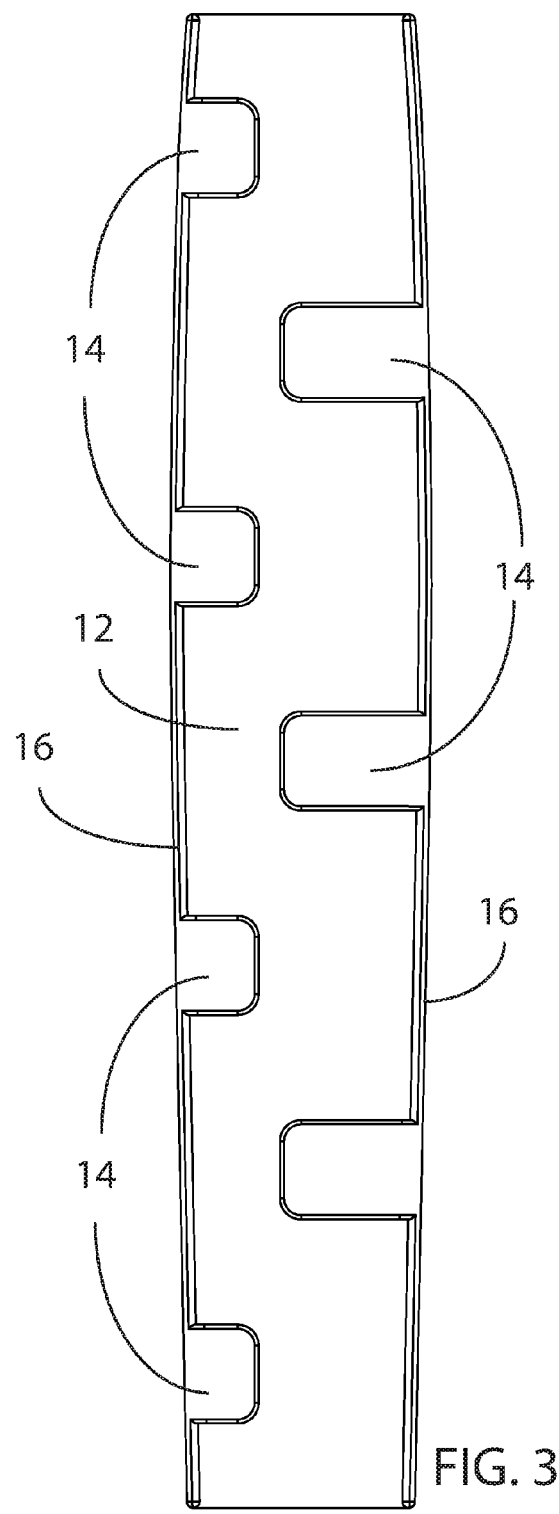
FIG. 3 is front elevation of the seatbelt threader device of FIG. 2.
Figure 12:
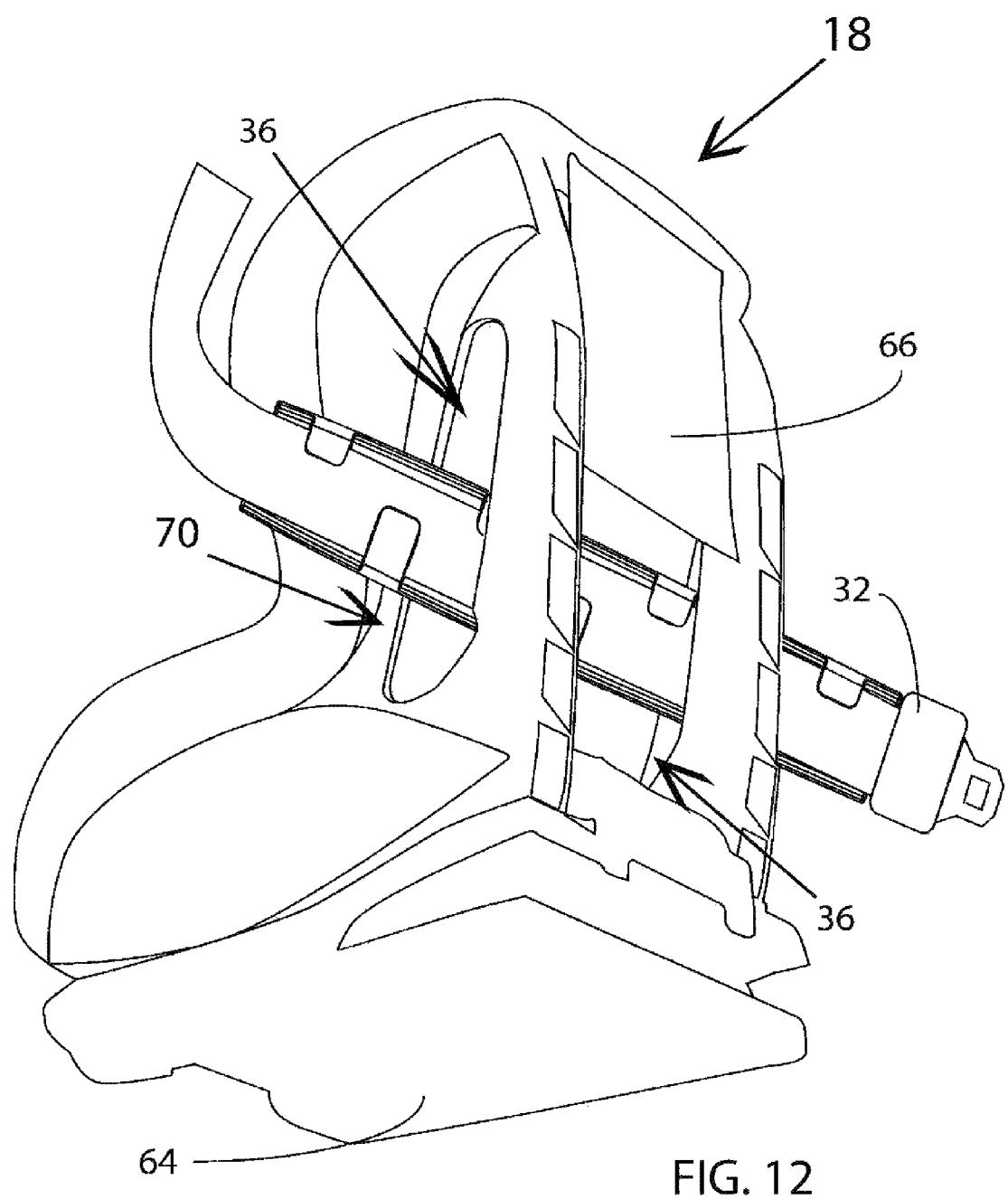
FIG. 12 is a rear perspective view of a child safety seat, the threader of FIG. 2 being utilized to threat a seatbelt therethrough.

As shown in FIGS. 1 and 12, The child safety seat 18 can have a seat portion 64 with a bottom configured to be disposed over the seat 40 of the vehicle seat, a backrest 66 configured to be disposed forward of the backrest 42 of the vehicle seat. In addition, the child safety seat can have at least one slot 70 formed in a back of the child safety seat. The at least one slot 70 can include a pair of spaced apart slots 36 on opposite sides of the child safety seat. The child safety seat and/or the at least one slot can have a width through which a user must thread the seatbelt.

The vehicle seat 22 can have a seatbelt retaining system typically utilized to safely restrain a seated user in the vehicle seat. In addition, the vehicle seat 22 can have a seat 40 and a backrest 42. The seatbelt retaining system can have a strap 46 with one end attached to the vehicle and another end attached to a retractor (not shown) that is attached to the vehicle and maintains a tautness of the strap or seatbelt by retracting any slackness in the strap. The strap 46 providing a lap belt 50 configured to cross a user's lap, and a shoulder belt 52 configured to cross a user's torso. In addition, the strap has a width, often between 2-4 inches. The seatbelt retaining system also has a buckle with a male component 32 coupled to the strap between the lap and shoulder belts 50 and 52, and releasably coupled to a female coupler component (not shown) attached to the vehicle on an opposite side of the vehicle seat 22 from the strap. In use, the child safety seat 18 (FIG. 12) is disposable on the seat 40 of the vehicle seat 22 with the strap 46 of the seatbelt restraining system extending through the at least one slot 70 of the child safety seat, and the male buckle component 56 coupled to the female component of the same.

Description

As illustrated in FIGS. 2-9, a seatbelt threader device, indicated generally as 10, in an example implementation in accordance with the invention is shown. The illustrated threading device 10 is a sheath formed with a front panel 12 and at least one tab or clip 14 defining in a rear side. The panel 12 and at least one tab 14 join at one of two long edges 16. The preferred embodiment features a plurality of tabs 14, with approximately half extending from one of the long edges 16 and the other half extending from the other long edge. Together, the front side 12, at least one tab 14, and long edges 16 define an interior space 18 into which a seat belt (FIGS. 10 and 11) may be inserted into the interior space through a space defined by the tabs 14 in their staggered relationship with each other. The seatbelt threader 10 can receive both lap belts 26 (FIG. 10) and shoulder/lap belts 50, 52 (FIG. 11), with a male component 32 of the seatbelt buckle at a distal end thereof, forming an insert. As shown in FIG. 12, this insert may then be threaded through a slot 36 of the child safety seat and then the male component 32 of the seat belt buckle secured to the female component of the same (not shown).

In one aspect, the at least one clip 14 can contact the panel 12 when the strap is removed. Thus, the strap or shoulder belt or strap 46 can be pinched between the at least clip 12 and the panel 14 when not in use and stored on the strap or shoulder belt or strap, as shown in FIG. 1. The sheath 10 can be slid along the strap or shoulder belt or strap into position for use.

The elongated sheath 10 is, or is formed of a material that is, flexible and resilient so that the sheath can be flexible to bend, and resilient or elastic to maintain a shape of the sheath. Thus, the sheath can be substantially straight, and can be elastic to return to the straight configuration. In addition, the sheath 10 can bend into a curve or the like to facilitate insertion through the child safety seat slot 70. The tabs 14 are spaced apart from each other so as to aid in the flexibility of the sheath. Furthermore, the elongated sheath 10 can have a greater rigidity than the strap 46 to facilitate insertion through the slot. The rigidity of the sheath 10 can support both its weight, and the weight of the belts and the buckle component. The sheath 10 itself may take any useful shape, including the curved shape shown in the figures. This particular curved shape provides an inherent and natural grasping surface. However, any shape which may be adapted to hold a seatbelt strap and with sufficient length while maintaining sufficient rigidity to enable a user to thread the end of the seatbelt through the car seat is more than sufficient for the basic purposes of this invention. Variant embodiments are illustrated in FIGS. 13-17, where tab position, number, and size are shown in FIGS. 13-15 and thickness variants are shown in FIGS. 16 and 17. In FIGS. 13 and 14, the size of the tabs 114 are shown to be shorter than in the first embodiment and two tabs at distal end 132 are shown directly across from each other in the embodiment shown in FIG. 13, as opposed to the staggered relationship originally illustrated. Such arrangements may allow easier insertion and removal of the strap while the embodiment shown in FIG. 15, with more and longer tabs 116 would provide a more secure hold of said strap. Different thicknesses of the sheath may also be contemplated, with a greater (FIG. 16) or smaller (FIG. 17) sheath width.

Another embodiment of the seatbelt threader device 8 (FIGS. 18-20) can have an elongated sheath 80 with a panel 84 on one side and at least one clip 88 opposing the panel, and defining the sheath. The sheath 80 and the panel 84 can have a long side 92 with the at least one clip 88 attached to the long side of the panel. The panel 84 and the at least one clip 88 can have free ends 96 opposite the long side 92, and defining an elongated slot 100 therebetween with an open end 104 along an opposite long side 108 of the sheath and the panel. The sheath 80 has a closed side 112 defined by the attachment of the at least one clip 88 thereto and an open side 116. The sheath also has opposite open ends 120 and 122 between the sides thereof. The elongated sheath has a length substantially equal to or greater than the width of the at least one slot 70. And the elongated slot 100 has a depth from the open end 104 greater than the width of the strap.

In one aspect of this alternate embodiment, the at least one clip 88 can comprise at least three clips, including end clips on opposite ends of the sheath, and an intermediate clip intermediate the end clips, with gaps defined between sequential clips. As with the previously described embodiment, the gaps can facilitate bending of the sheath. In addition, the at least one clip 88 and the panel 80 can be separated by a distance of at least a thickness of the lap and shoulder belts or straps. The lap and shoulder belts can be received in the slot along the entire length of the sheath. Furthermore, the at least one clip 88 can be biased and angled towards the panel 80. Also, the panel 84 or sheath 80 can have a lip 126 on the opposite long side 108 of the panel that can be curved or angled inwardly with respect to the at least one clip 88. The lip can help retain the strap in the slot 100. In one aspect, the panel 80 and the at least one clip 88 can each have a length extending from the long side 92 or closed side 112 with the panel being longer than the at least one clip 88 so that the at least one clip 88 extends short of the lip 126, defining the open end 104 or opening to the elongated slot 100.

In addition, the sheath 80 and the panel 84 can have a proximal end 130 and an opposite distal end 132. In use, the lap and shoulder belts or straps 50 and 50 are disposed in the slot 100 of the elongated sheath 80, and sandwiched between the panel 84 and the at least one clip 88, with the male buckle component at the distal end 132 of the sheath 80, and defining an insert with a greater rigidity than the strap. The insert, or the sheath 80 with a strap disposed therein, extends through the slot 70 of the child safety seat as described above.

In addition, a grip 140 can be formed in the proximal end 130 of the sheath 80. The grip can include a series of indentations in the long sides of the panel. Furthermore, a pad layer 144 can be disposed on an outward face of the panel 84 to facilitate sliding of the sheath or insert, and to add comfort.

Based upon the above description of the seat belt threader and its use, a method for securing a child safety seat 18 to a vehicle seat 22 utilizing a seat belt threader, includes:
- disposing the child safety seat 18 on a seat 40 of the vehicle seat 22;
- inserting a seatbelt strap into an interior space defined between a panel 12 and at least one clip 14 of an elongated sheath 10 to define an insert;
- disposing a male component of a seat belt buckle at a distal end of the elongated sheath;
- grasping a proximal end of the elongated sheath;
- inserting the male component of the buckle 56 and the insert through at least one slot 70 in a back of the child safety seat 18 until the latch plate exits the at least one slot; and
- coupling the male component to a female component of a seatbelt buckle.

In addition, the method can include:
first inserting the seatbelt strap into the interior space of the elongated sheath; and
leaving the sheath to be carried by the seatbelt strap until use.

Furthermore, the method can include:
removing the seatbelt strap from the elongated sheath.

The sheath can be formed of plastic, and can be manufactured by injection molding. The pad layer can be felt adhered to the panel.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

I claim:

1. A seatbelt threader device in combination with a seatbelt, said seatbelt comprising a strap and a buckle component with the buckle component defining two lengths of the strap, the seatbelt threader device comprising: a. an elongated sheath with a panel on one side and at least one clip opposing the panel and defining the sheath, the panel having two long sides with the at least one clip attached to one long side of the panel and the at least one clip having at least one free end opposite thereto, and defining an interior space therebetween, the sheath also having two opposite open ends, one being termed a proximal end and one a distal end, between the sides thereof; and b. both lengths of the strap being simultaneously and substantially disposed in a back-to-back orientation within the interior space of the sheath from the distal end to the proximal end with the buckle component located adjacent the distal end of the sheath, thereby defining an insert with a greater rigidity than the strap which is maintained adjacent the buckle component when the insert is threaded through a car seat and said buckle component is mated to a buckle latch.

2. The combination of claim 1, the elongated sheath of the device being formed of a material that is flexible and resilient so that the sheath can be flexible to bend, and resilient to maintain a shape of the sheath.

3. The combination of claim 1, the elongated sheath of the device further comprising a lip on the opposite long side of the panel curved or angled inwardly with respect to the at least one clip.

4. The combination of claim 1, the at least one clip of the elongated sheath of the device comprising at least three clips, including end clips on opposite ends of the sheath and an intermediate clip intermediate the end clips, with gaps defined between sequential clips.

5. The combination of claim 1, the at least one clip of the elongated sheath of the device comprising at least three clips, wherein at least one clip is situated on each long side of the panel.

6. The combination of claim 1, the sheath of the device further comprising a grip formed in the proximal end of the sheath and further comprising a series of indentations in the long sides of the panel.

7. The combination of claim 1, the device further comprising a pad layer disposed on an outward face of the panel.

8. A method for securing a child safety seat to a vehicle seat, comprising:
a. disposing the child safety seat on a seat of the vehicle seat;
b. inserting a first portion of a seat belt strap, up to a buckle component, into an interior space of a threader, the interior space being defined as being between a panel and at least one clip of an elongated sheath;
c. disposing the buckle component of the seatbelt at a distal end of the elongated sheath and a second portion of the seat belt strap, opposite the buckle component from the first portion of the seat belt strap, into the interior space of the elongated sheath, thereby defining an insert with both portions of the strap simultaneously within the interior space of the threader;

d. grasping a proximal end of the elongated sheath;

e. inserting the buckle component and the insert through at least one slot in a back of the child safety seat until the buckle component exits the at least one slot; and f. coupling the buckle component to a second buckle component of seatbelt.

9. A method in accordance with claim 8, further comprising:

a. first inserting the strap into the interior space of the elongated sheath; and b. leaving the sheath to be carried by the strap until use.

10. A method in accordance with claim 8, further comprising removing the strap of the seatbelt from the elongated sheath.

* * * * *